United States Patent [19]

Matsumoto et al.

[11] Patent Number: 4,705,828

[45] Date of Patent: Nov. 10, 1987

[54] POLYPROPYLENE RESIN COMPOSITION AND BIAXIALLY STRETCHED FILM THEREOF

[75] Inventors: Yoshio Matsumoto; Toshio Fujii; Yoshinao Shinohara; Kiyoshi Fukuda, all of Kurashiki, Japan

[73] Assignee: Mitsubishi Chemical Industries Limited, Tokyo, Japan

[21] Appl. No.: 826,591

[22] Filed: Feb. 6, 1986

[30] Foreign Application Priority Data

Feb. 6, 1985 [JP] Japan ................................ 60-21043

[51] Int. Cl.$^4$ .................... C08L 23/12; C08L 9/00; C08L 11/00
[52] U.S. Cl. .................................. 525/232; 525/192; 525/194; 525/221; 525/203; 525/213; 525/218; 525/222; 525/227; 525/233; 525/911; 525/914; 525/918; 524/388; 526/348.1
[58] Field of Search ............... 525/232, 911, 914, 240, 525/215, 194, 192; 526/348.1; 524/388

[56] References Cited

U.S. PATENT DOCUMENTS

| | | | |
|---|---|---|---|
| 3,407,253 | 10/1968 | Yoshimura et al. | 525/240 |
| 3,627,856 | 12/1971 | Thienot | 525/232 |
| 4,032,493 | 6/1977 | Pascual | 525/240 |
| 4,283,463 | 8/1981 | Shiga et al. | 526/348.1 |
| 4,394,235 | 7/1983 | Brandt et al. | 525/240 |
| 4,522,994 | 6/1985 | Chiba et al. | 525/240 |

FOREIGN PATENT DOCUMENTS 57-085837  5/1982  Japan .

*Primary Examiner*—Carman J. Seccuro
*Attorney, Agent, or Firm*—Oblon, Fisher, Spivak, McClelland, & Maier

[57] ABSTRACT

Disclosed herein are a polypropylene resin composition comprising 100 parts by weight of propylene homopolymer showing a stereoregularity of a boiling heptane-insoluble part thereof of not less than 0.960 as an isotactic pentad rate obtained by $^{13}$C-NMR and 0.01 to 2 parts by weight of a hydrocarbon polymer having completely or partially saturated main hydrocarbon chain and at least one hydroxy group at an end of the main hydrocarbon chain, and a biaxially stretched film comprising the polypropylene resin composition.

17 Claims, No Drawings

POLYPROPYLENE RESIN COMPOSITION AND BIAXIALLY STRETCHED FILM THEREOF

BACKGROUND OF THE INVENTION

The present invention relates to a polypropylene resin composition excellent in mechanical properties, particularly rigidity and stretchability, and a biaxially stretched film comprising the polypropylene resin composition.

Since the biaxially stretched polypropylene film is excellent in optical properties such as transparency and luster, heat-resistance, chemical-resistance and electrical properties as well as in mechanical properties such as tensile strength and rigidity, it is broadly used for packaging and preparing electric components such as capacitor, electric cable, etc. However, in the case of using therefor there are cases that the above-mentioned properties have been sufficiently satisfied and accordingly, the enlargement of the actual use of the biaxially stretched polypropylene film has been restricted. Particularly, the biaxially stretched polypropylene film is inferior to cellophane and polyester film in rigidity (so-called nerve) and accordingly, it is difficultly applicable to automatic packaging in overlap-packaging and twist-packaging. In addition, due to the insufficient rigidity thereof, the biaxially stretched polypropylene film is apt to be crumpled when it is processed into capacitor film resulting in the weak point of reducing the processability.

The rigidity of polypropylene is greatly affected by the draw ratio and the structure thereof. The term "polypropylene" means propylene homopolymer and random copolymer of propylene and a small amount of ethylene. Since the propylene homopolymer is superior to the random copolymer in rigidity, the stretched propylene homopolymer is generally used in the case of necessitating rigidity. As the method for further improving the original rigidity of the propylene homopolymer, a method (1) of using propylene homopolymer of higher than 98.0% of isotactic index (hereinafter referred to as I.I.) has been proposed (refer to Japanese Patent Application Laid-Open (KOKAI) No. 57-103819).

In addition, as the method for improving the stretchability of the propylene homopolymer, a method (2) for using the random copolymer, for instance, the copolymer of propylene and ethylene prepared by polymerizing propylene in the presence of a catalyst comprising titanium trichloride and an organic aluminum compound, prepared by reducing titanium tetrachloride by an organic aluminum compound and further activating the thus reduced substance, while adding a small amount of ethylene thereto in the course of polymerizing propylene, has been proposed, the content of ethylene units in the copolymer being 0.1 to 1.0% by weight (refer to Japanese Patent Application Laid-Open (KOKAI) No. 56-32512).

However, although according to the method (1) the rigidity of the propylene homopolymer is improved by raising I.I. thereof, the stretchability of the thus obtained propylene homopolymer is reduced still less and accordingly, it is more difficult to stretch the thus obtained propylene homopolymer at a high draw ratio, and as a result, it is impossible to obtain stretched polypropylene films so much excellent in rigidity.

On the other hand, although according to the method (2) the stretchability of the random copolymer is somewhat improved, I.I. of the thus produced random copolymer is highly reduced by the copolymerization with an extremely small amount of ethylene and accordingly, only a stretched polypropylene film of limpness is obtained As has been shown above, although the methods for improving either the rigidity or the stretchability of "polypropylene" have been proposed, the polypropylene excellent in both rigidity and stretchability has not been developed.

In consideration of the conventional techniques, the present inventors have studied the methods for improving both the rigidity and the stretchability of the polypropylene, and as a result, it has been found that by combining a small amount of a specified hydrocarbon polymer with a specified polypropylene, the stretchability of the thus prepared polypropylene resin composition is greatly improved while retaining the intrinsic rigidity of the polypropylene, and based on the finding, the present invention has been attained.

SUMMARY OF THE INVENTION

In a first aspect of the present invention, there is provided a polypropylene resin composition comprising 100 parts by weight of propylene homopolymer showing a stereoregularity of a boiling heptane-insoluble part thereof of not less than 0.960 as an isotactic pentad rate obtained by $^{13}$C-NMR (nuclear magnetic resonance spectroscopy) and 0.01 to 2 parts by weight of a hydrocarbons polymer having completely or partially saturated main hydrocarbon chain and at least one hydroxy group at an end of the main hydrocarbon chain.

In a second aspect of the present invention, there is provided a biaxially stretched film produced by (1) melt-molding a polypropylene resin composition comprising 100 parts by weight of propylene homopolymer showing a stereoregularity of a boiling heptane-insoluble part thereof of not less than 0.960 as an isotactic pentad rate obtained by $^{13}$C-NMR and 0.01 to 2 parts by weight of a hydrocarbons polymer having completely or partially saturated main hydrocarbon chain and at least one hydroxy group at an end of the main hydrocarbon chain to form a film, and (2) biaxially stretching the thus obtained film at a temperature of 150° to 200° C. by the T-die method or the inflation method.

DETAILED DESCRIPTION OF THE INVENTION

Polypropylene used according to the present invention is propylene homopolymer and the stereoregularity of the boiling heptane-insoluble part thereof is not les than 0.960, as the isotactic pentad rate obtained by $^{13}$C-NMR, not less than 0.970, more preferably not less than 0.975.

Such a propylene homopolymer can be produced by the methods disclosed in Japanese Patent Applications Laid-open (KOKAI) Nos. 59-13630 and 56-59285. In the case where the isotactic pentad rate is below 0.960, it is not favorable because the improvement of the rigidity of stretched film is small.

The isotactic pentad rate of the boiling heptane insoluble part of the propylene homopolymer is obtained as follows.

After completely dissolving 5 g of the specimen of propylene homopolymer in 500 ml of boiling xylene and leaving the thus formed solution to cool to 20° C., the resultant mixture is subjected to filtration, thereby separating the mixture into the xylene-soluble part and the xylene-insoluble part respectively at 20° C. Then, the xylene-insoluble part at 20° C. is subjected to soxhlet-extraction for 6 hours with boiling heptane, thereby separating the part into the residue and the extract. The thus obtained residue is named the boiling heptane-insoluble part.

The isotactic pentad rate is measured by the method disclosed in "Macromolecules", Vol. 8, page 687(1975), and is the isotactic rate of the pentad units in the molecular chain of propylene homopolymer determined by using $^{13}$C-NMR spectrum. Concretely, the isotactic pentad rate is measured as the fraction of area of the peak "m m m m" in all the absorption peaks in the region of methyl-carbon appearing in the $^{13}$C-NMR spectrum of the specimen of propylene homopolymer.

The melt-flow index (hereinafter referred to as MFi) of propylene homopolymer used according to the present invention may optionally be that of the polypropylene used in the field of stretched films, however, MFi of propylene homopolymer used according to the present invention is preferably in the range of 0.2 to 10 measured at 230° C. under a load of 2160 g according to the method of Japanese Industrial Standards (JIS) K-7210, preferably in the range of 0.5 to 7, more preferably in the range of 0.5 to 6.

On the other hand, the hydrocarbon polymer having completely or partially saturated main hydrocarbon chain and at least one hydroxy group at the end of the main hydrocarbon chain, which is used in combination with the propylene homopolymer, is exemplified as follows.

Namely, the hydrocarbon-polymer includes liquid polymers, semisolid polymers and solid polymers at ordinary temperature of a molecular weight of 500 to 200,000, which have completely or partially saturated main hydrocarbon chain and at least one hydroxy group at the chain end thereof. The average number of the hydroxy groups per one molecule of the hydrocarbon polymer is preferably from 1.5 to 8.0.

The main hydrocarbon chain of the hydrocarbon polymer used according to the present invention has been completely or partially saturated and provided with at least one hydroxy group at the end thereof. Namely, in the case where the main hydrocarbon chain takes the form of hydrogenated 1,4-polybutadiene, the hydrogenation degree is at least 20%, preferably not less than 50% and more preferably not less than 80%.

The hydrocarbon polymer having the main hydrocarbon chain completely or partially saturated and at least one hydroxy group at the end thereof is obtained by ordinarily subjecting to hydrogenation a diene polymer and/or a diene-copolymer produced from the raw material such as diene(s) by a well known method, for instance, a radical polymerization method or an anionic polymerization method.

In the case of the anionic polymerization method, according to the conditions, 1,2-polybutadiene which has the saturated hydrocarbon main chain and has the necessary amount of vinyl groups, for instance, not less than 50%, particularly not less than 70% on the alternative carbon atoms of the polydiene skeleton is obtained and accordingly, it is not necessary to subject the 1,2-polybutadiene to hydrogenation.

The diene polymer having at least one hydroxy group at the chain end thereof is easily obtained by subjecting a monomeric diene to radical polymerization while using hydrogen peroxide as the initiator of polymerization.

In order to obtain the polymer having hydroxy group at the chain end thereof by an anionic polymerization method, for instance, monoepoxy compound, formaldehyde, acetaldehyde, acetone, halogenoalkylene oxide or polyepoxide is reacted with a living polymer which is produced by subjecting a conjugated diene singly or together with a vinyl monomer to polymerization in the presence of a catalyst for anionic polymerization, for instance an alkali metal or an organic alkali metal compound and which has a structure that alkali metal is bonded to at least one of the both chain ends.

As the raw monomeric material of the polymer, at least one kind of conjugated diene monomer is used, and as the conjugated diene monomer, butadiene-1,3; isoprene; chloroprene; pentadiene-1,3; 2,3-dimethylbutadiene-1,3; 1-phenylbutadiene-1,3 and the like may be exemplified.

On the other hand, as the copolymerizable monomer of the conjugated diene copolymer, one or not less than two vinyl monomers are used. As the vinyl monomer, vinyl aromatic compounds such as styrene, α-methylstyrene, vinyltoluene and the like; derivatives of (meth)acrylic acid such as methyl acrylate, butyl acrylate, methyl methacrylate and the like; nitrile compounds such as acrylonitrile, methacrylonitrile and the like; vinylpyridines such as 2-vinylpyridine, 4-vinylpyridine and the like; vinyl ethers such as methyl vinyl ether, 2-chloroethyl vinyl ether and the like; halogenated vinyl compounds such as vinyl chloride, vinyl bromide and the like and vinyl esters such as vinyl acetate and the like may be exemplified. In addition, a vinyl monomer having active hydrogen such as 2-hydroxyethyl methacrylate, acrylic acid and acrylamide may be used.

In the case of using such a monomer together with the monomer of conjugated dienes, the amount of the vinyl monomer is preferably not more than 50% by weight of the total amount of the monomers in the case where the physical properties of the final product is taken into consideration.

Of course, each of the dienes polymers and/or copolymers is used after completely or partially hydrogenating the unsaturated (double) bonds of the main chain of the polymer and/or copolymer. However, in the case of 1,2-polybutadiene or 3,4-polyisoprene which does not contain any unsaturated bond in the main chain of the polymer, each of the polymers is used without being hydrogenated.

The hydrogenation may be effected completely or partially, however, concerning 1,4-butadiene, the hydrogenation degree is at least 20%, preferably not less than 30%. In the case where the hydrogenation degree is below 20%, the adhesive strength of the final product is insufficient, and even in the case where the product has some adhesive strength, unevenness is caused in the adhering surface and it is not favorable.

Since the number (%) of carbon atoms participating in the unsaturation (formation of double bonds) in the main chain of 1,4-polybutadiene is 50% of the total carbon atoms of 1,4-polybutadiene, according to the present invention it is necessary to reduce the number (%) of such carbon atoms in the total number of carbon atoms into not more than 40%.

On the other hand, since the number (%) of carbon atoms participating the unsaturation in the main chain of polybutadiene of 50% in 1,2-linking of the total number of the carbon atoms is only 33%, such a 1,2- polybutadiene of 50% in 1,2-linking can be used as the hydrocarbon polymer according to the present invention without being subjected to hydrogenation.

In hydrogenating the polymer, a contact-hydrogenation generally used can be adopted. Namely, as the catalyst for hydrogenation, the conventionally used nickel catalyst (for instance, Raney nickel), cobalt catalyst, platinum catalyst, palladium catalyst, ruthenium catalyst, rhodium catalyst, the mixed catalyst thereof or a metal alloys catalyst may be used. Such a catalyst may be used singly or may be used as a soluble uniform complex, as a solid, or as a material in which the catalyst is carried on carbon, silica, diatomaceous earth and the like. Further, hydrogenation may be carried out in the presence of a metal complex obtained by reducing a compound containing nickel, titanium, cobalt and the like with an organic metal compound (for instance, trialkylaluminum, alkyllithium and the like. As hydrogen used in hydrogenation, ordinarily molecular hydrogen is used. However, a hydrogen-containing gas may be used as far as the gas does not contain a substance acting as a catalyst poison. Hydrogen for use in hydrogenation may be supplied by blowing under ordinary pressure or under a pressure. Hydrogenation is carried out at a temperature in the range of room temperature to 200° C., preferably at a temperature of not more than 180° C.

The diene polymer and/or copolymer of diene copolymer is supplied to the hydrogenation system singly or after dissolving in a solvent. As the solvent, aliphatic hydrocarbons, cycloaliphatic hydrocarbons, aromatic hydrocarbons, alcohols, aliphatic carboxylic acids may be used singly or as a mixture thereof.

As the other method for producing the saturated hydrocarbons polymer used in preparing the composition according to the present invention, a method wherein a copolymer of α-olefin and a copolymerizable monomer other than α-olefin is subjected to oxidation and decomposition, and the thus formed substance is reduced is exemplified. For instance, at first, a copolymer of butyl rubbers obtained by subjecting isobutylene and butadiene or 1,3-pentadiene to cationic polymerization is subjected to ozonolysis and then the resultant substance is reduced by lithium aluminum hydride to obtain polyhydroxypolyisobutylene. In addition, a polyhydroxypolyolefin is obtained by subjecting a poly-α-olefin obtained by singly polymerizing ethylene or copolymerizing ethylene with a diene in the presence of propylene, and has unsaturated bonds (double bonds) to ozonolysis and then reducing the resultant substance.

The amount of blending the hydrocarbons polymer having completely or partially saturated main hydrocarbon chain and at least one hydroxy group at the main chain end thereof for improving the stretchability of the film comprising polypropylene resin composition according to the present invention is ordinarily 0.01 to 2 parts by weight, preferably 0.1 to 2 parts by weight and more preferably 0.3 to 1.2 parts by weight to 100 parts by weight of the propylene homopolymer. In the case where the amount of blending is below 0.01 part by weight to 100 parts by weight of propylene homopolymer, the effect of improving the stretchability appears only a little, and on the other hand, in the case where the amount of blending is 2 parts by weight to 100 parts by weight of propylene homopolymer, the effect of improving the stretchability is not raised further more than that obtained within the range of 0.01 to 2 parts by weight to 100 parts by weight of propylene homopolymer, and inversely, the solvent-resistance of the product lower and accordingly, such a large amount of blending is not favorable.

The polypropylene resin composition according to the present invention is obtained by after dry-blending the propylene homopolymer and the hydrocarbon polymer having completely or partially saturated main hydrocarbon chain and at least one hydroxy group at the main chain end thereof in a blender and the like, or melt-mixing the thus blended material at a temperature of 190° to 300° C. while using a Bambury mixer, continuous mixer, mixing rolls, extruder and the like, thereby pelletizing the thus melt-mixed material to obtain the resin composition in pellets.

Into the polypropylene resin composition according to the present invention, any known additives used in the conventional polypropylene such as heat stabilizer, antioxidant, ultraviolet ray-absorbent, antiblocking agent, lubricant and other additives may be admixed.

In the present invention, non-stretched films or sheets are prepared by using the thus produced polyethylene resin composition and then, the thus prepared non-stretched film or sheet is biaxially stretched under the specified conditions to form the biaxially stretched film.

The preparation of the non-stretched film or sheet is carried out by the conventional apparatus and method for preparing film or sheet, for instance, by the inflation-molding method while using a circular die or the T-die molding method while using a T-die, under the conditions of the temperature of the resin composition of 190° to 300° C. and the draft rate of 1 to 50.

In the case where the non-stretched film is prepared by inflation-molding, it is preferable to mold under the conditions of the temperature of the resin composition of 200° to 270° C., the draft rate of 1 to 50, the blow-up ratio of 1.5 to 4.0 and the cooling rate index ($\tau$) of not more than 7.

In the present invention, the draft rate is represented as follows.

$$\text{Draft rate} = \frac{\rho_m}{\rho_f} \cdot \frac{G}{t} \cdot \frac{1}{BUR} \quad (I)$$

wherein

G is the width of the die slit, t is the thickness of the thus obtained film, $\rho_m$ is the density of the resin composition extruded from the die slit, $\rho_f$ is the density of the thus produced film and BUR is the blow-up ratio.

In the case where the non-stretched film is prepared by T-die-molding, the draft rate is expressed by substituting BUR to 1 (BUR=1) in the above-mentioned formula (I).

In the case where the draft rate is below 1, the optical properties of the thus produced film is poor, the draft rate is below 1 is unfavorable. On the other hand, in the case where the draft rate is over 50, the film is apt to be split (longitudinally) and accordingly, the draft rate of over 50 is unfavorable.

In addition, the cooling rate index ($\tau$) is the retention time during which the molten resin composition extruded from the die arrives at the frost line (in the case of inflation-molding) or the air gap (in the case of T-die-molding) expressed by sec, and represented by the following formula:

$$\tau = \frac{A_1}{V_1 - V_0} \ln\left(\frac{V_1}{V_2}\right) \quad \text{(II)}$$

wherein

τ is the cooling rate index (sec), $A_1$ is the height of the frost line (cm) or of the air gap (cm), $V_1$ is the winding-up rate of the film (cm/sec) and $V_0$ is the linear rate of the molten resin composition at the outlet of the die.

As has been shown, in the present invention, the cooling rate index (τ) is set up to be not more than 7, and may be controlled to be the predetermined level by changing the factors in the formula (II) in combination. For instance, in the case of intending the change of the height of the frost line or of the air gap while maintaining the cooling rate index (τ) at constant, the cooling ratio of the cooling apparatus such as air-cooling or the distance from the T-die to the cooling rolls may be changed. In the case of intending the change of $V_0$ or $V_1$ while maintaining the cooling rate index (τ) at constant, the amount of extrusion from the extruder or the winding-up rate of the winding machine may be changed. Namely, the index of cooling rate index (τ) is set up by the combination of the factors in the formula (II).

In the case where the index of cooling rate index (τ) is over 7, the bubble becomes unstable due to the insufficient cooling and the strength of the film is reduced by the relaxation of the molecular orientation in the film.

In addition, in the case where the non-stretched film is prepared by T-die molding, it is preferable to mold under the conditions of the temperature of the resin composition of 190° to 300° C., the draft rate of 1 to 10, the cooling rate index of not more than 7 and the temperature of the cooling rolls of from 40° to 120° C.

The thus obtained, non-stretched film is then biaxially stretched wherein the non-stretched film obtained by the T-die method or the inflation method is successively stretched biaxially or simultaneously stretched biaxially to stand as it is or after slitting the non-stretched film into a predetermined width. In the case of carrying out the successive biaxial stretching, the non-stretched film is at first stretched in the longitudinal direction (in the direction of taking the film) and then further stretched in the transversal direction (perpendicular to the direction of taking the film), or vice versa. On the other hand, in the case of carrying out the simultaneous biaxial stretching, the allotment of time for longitudinal stretching and time for transversal stretching is optionally effected, for instance, (1) the film is slowly and continuously stretched longitudinally until the transversal stretching is finished, (2) stretching is begun simultaneously both in the longitudinal direction and in the transversal direction or (3) the longitudinal stretching is finished at first, etc.

In the present invention, it is possible to adopt the tenter method of the successive biaxial stretching, and the tubular method of the simultaneous biaxial stretching, etc., however, the tenter method of the successive biaxial stretching is favorable, because the transparency of the thus biaxially stretched film is remarkably excellent.

The treatment of biaxial stretching in the present invention is carried out under the following conditions of (1) the stretching temperature, (2) the stretching rate and (3) the stretch ratio.

The stretching temperature is in the range of 150° to 200° C., preferably 155° to 175° C. In the case of the stretching temperature of below 150° C., the film is apt to be cut during stretching because of the insufficient mobility of the molecular chain of the polymer, and in the case where even the film can be stretched, the stretch ratio cannot be raised sufficiently and accordingly it is impossible to obtain any stretched film excellent in physical properties. On the other hand, in the case of stretching the film at a temperature over 200° C., it is impossible to effect the orientation of the molecules of the polymer by stretching because of the partially beginning of melting of the resin composition and accordingly, even in the case where the apparent stretching is observed, the unevenness of stretching is remarkable and the transparency of the product is impaired, namely, it is impossible to obtain a film having commercial value.

The stretching rate is in the range of 2 to 50%/sec, preferably in the range of 10 to 30%/sec. In the case of below 2%/sec, the stretchability of the film is apt to be reduced due to the orientation-crystallization of the polymers during stretching, and on the other hand, in the case of over 50%/sec, the modification of the shape of the polymer cannot follow the stretching rate resulting in breaking of the film by stretching.

The stretch ratio is in the range of 2 to 10 times in the longitudinal direction of the film, preferably 4 to 10 times and in the range of 2 to 10 times in the transversal direction of the film, preferably 4 to 10 times from the viewpoint of the operability of the film in stretching and the physical properties of the thus biaxially stretched film. In the case where the stretch ratio in the longitudinal direction is below 2 times, the unevenness in the thickness of the thus obtained stretched film is large and as a result, any uniformly stretched film cannot be obtained. On the other hand, in the case where the stretch ratio is over 10 times, the operability of the film in stretching is impaired and accordingly it is impossible to obtain any satisfiable film.

According to the present invention, by blending a saturated hydrocarbons polymer having at least one hydroxy group at the main chain end thereof with a specified polypropylene, it is possible to obtain a polypropylene resin composition of a remarkably improved stretchability while retaining therein the high rigidity of propylene homopolymer.

Accordingly, since a biaxially stretched film comprising the polypropylene resin composition obtained according to the present invention has a high rigidity, the film can be suitably used for packaging and preparing electrical devices such as capacitor, electric cable, etc.

The present invention will be explained more in detail while referring to the following non-limitative examples.

For reference, the methods for determination of the important properties of the polymer and the film of the present invention are set forth below.

(1) Method for determining the isotactic pentad fraction:

After heating 5 g of a specimen of polypropylene in 500 ml of p-xylene under a reflux condenser for 5 min and leaving the mixture to cool, the thus precipitated material is treated with n-heptane for 6 hours under a reflux condenser. The thus obtained insoluble material was subjected to $^{13}$C-NMR spectroscopy. The method of $^{13}$C-NMR spectroscopy and the method for analysis of the thus obtained spectrum are described in Macromolecules, 8, 687 (1975).

(2) Method for evaluating the stretchability of a film

For the evaluation of the stretchability of the non-stretched film, the mechanical stress in the time of longitudinal stretching and that in the time of transversal stretching are recorded as the indices for evaluating the stretchability of the non-stretched film in the biaxial stretching. The smaller is the mechanical stress, the more excellent is the stretchability.

(3) Method for determination of the rigidity of the biaxially stretched film

The initial elastic modulus is measured using a specimen of the biaxially stretched film of 25 mm in width and 140 mm in length by a tensile tester under a cross-head-velocity of 10 mm/min, as the index representing the rigidity of the specimen.

EXAMPLES 1 to 5

(1) Production of a polymer of saturated hydrocarbon series having a hydroxy group at the end of main chain thereof Into an autoclave of 10 litres in capacity, 3 kg of polyhydroxypolybutadiene (made by Arco Chem. Co., Ltd., R-45 HT, hydroxyl group of 0.82 meq/g, and 15% by weight of cis-1,4 polymer, 58% by weight of trans-1,4 polymer and 27% by weight of vinyl), 3 kg of cyclohexane and 300 g of a catalyst (5% by weight of ruthenium carried by carbon, made by Nippon Engerhardt Co., Ltd.) were introduced, and after substituting the gas phase in the autoclave by purified argon, the supply of highly purified gaseous hydrogen to the autoclave was begun together with the beginning of the heating thereof. After about 30 min, the conditions within the autoclave became to 100° C. in temperature and 150 kg/cm$^2$ in pressure. After leaving the autoclave for 15 hours under the above-mentioned conditions, hydrogenation was stopped, and the thus hydrogenated polymer was purified and dried according to the ordinary procedures.

The thus obtained polymer was found to be a hydrocarbons polymer practically not containing double bonds by IR absorption spectroscopy and containing 0.81 meq/g of hydroxyl group. Molecular weight of the polymer measured by vapour-pressure method was 3000.

(2) Preparation of the polypropylene resin composition and of the biaxially stretched film To 100 parts by weight of a propylene homopolymer of a melt-flow rate index of 2.5 g/10 min and of an isotactic pentad rate of 0.980, an amount (shown in Table 1) of the polymer of saturated hydrocarbons having a hydroxy group at the end of main chain obtained as above (1) was added, and the mixture was subjected to dry-blending.

The thus obtained blended mixture was melt-kneaded by a monoaxial extruder of a cylinder diameter of 40 mm at 190° C. to pelletize the mixture, i.e., the polypropylene resin composition according to the present invention melting at 162° C.

The composition was extruded into a shape of a sheet of 2 mm in thickness by a T-die type molding machine under the conditions of the temperature of the resin composition of 260° C., the temperature of the cooling rolls of 90° C., the winding-up rate of 0.5 m/min and the draft rate of 1.5.

The thus obtained sheet was at first stretched in longitudinal direction at 160° C. by 5 times and then stretched in transversal direction at 165° C. by 9 times while using a batch-type biaxially stretching machine (namely, subjected to successive biaxial stretching) to obtain a biaxially stretched film of about 45 μm in thickness. The stretchability and the rigidity of the specimen during the above-mentioned operations were measured according to the methods shown above. The results are shown in Table 1.

COMPARATIVE EXAMPLE 1

A biaxially stretched film was produced in the same manner as in Example 1 except for not adding the saturated hydrocarbons polymer having a hydroxy group at the main chain end to the propylene homopolymer. The results are also shown in Table 1.

COMPARATIVE EXAMPLE 2

A biaxially stretched film was produced in the same manner as in Example 1 except for adding 3 parts by weight of the saturated hydrocarbons polymer having a hydroxy group at the end of main chain to the propylene homopolymer instead of adding 0.1 part by weight of the same in Example 1. The results are also shown in Table 1.

COMPARATIVE EXAMPLES 3 and 4

A biaxially stretched film was produced in the same manner as in Example 1 except for (i) using a propylene homopolymer of an MFi of 2.0 g/10 min and an isotactic pentad rate of 0.96 (Comparative Example 3) or a propylene homopolymer of an MFi of 2.0 g/10 min and an isotactic pentad rate of 0.955 (Comparative Example 4) instead of the propylene homopolymer produced in Example 1 and (ii) not adding the saturated hydrocarbons polymer having a hydroxy group at the end of main chain.

The results are also shown in Table 1.

TABLE 1

| Example No. | Physical properties of PP[1] | | Amount of hydrocarbon polymer[2] (parts by weight) | Stress in elongation (kg/cm$^2$) | | Elastic modulus in stretching (longitudinal/ transversal) (kg/cm$^2$) |
|---|---|---|---|---|---|---|
| | MFi (g/10 min) | Isotactic pentad rate | | longitudinal | transversal | |
| Example | | | | | | |
| 1 | 2.5 | 0.980 | 0.1 | 14.5 | 11.6 | 195/493 |
| 2 | 2.5 | 0.980 | 0.2 | 14.2 | 11.0 | 196/495 |
| 3 | 2.5 | 0.980 | 1 | 13.6 | 9.9 | 198/493 |
| 4 | 2.5 | 0.980 | 2 | 12.0 | 8.5 | 188/500 |
| 5 | 2.5 | 0.980 | 0.05 | 15.0 | 11.9 | 196/498 |
| Comparative Example | | | | | | |
| 1 | 2.5 | 0.980 | 0 | 15.9 | 12.3 | 197/502 |

TABLE 1-continued

| Example No. | Physical properties of PP[1] | | Amount of hydrocarbon polymer[2] (parts by weight) | Stress in elongation (kg/cm$^2$) | | Elastic modulus in stretching (longitudinal/ transversal) (kg/cm$^2$) |
|---|---|---|---|---|---|---|
| | MFi (g/10 min) | Isotactic pentad rate | | longitudinal | transversal | |
| 2 | 2.5 | 0.980 | 3 | 12.0 | 8.0 | 189/489 |
| 3 | 2.0 | 0.967 | 0 | 14.5 | 11.3 | 169/490 |
| 4 | 2.0 | 0.955 | 0 | 13.2 | 10.4 | 143/440 |

Notes:
[1]PP means propylene homopolymer.
[2]Hydrocarbon polymer means the saturated hydrocarbons polymer having a hydroxy group at the main chain end thereof.

As are clearly seen in Table 1, although the propylene homopolymer of a high stereoregularity requires a high stress in stretching, by blending the saturated hydrocarbon polymer having a hydroxy group at the main chain end thereof with such a propylene homopolymer, the stress in stretching such a composition is reduced while retaining the original rigidity of the propylene homopolymer.

In addition, in order to produce a biaxially stretched film by using an apparatus of industrial scale, polypropylene resin compound showing a longitudinal stress in stretching of not more than 1.5 kg/cm$^2$ and of a transversal stress in stretching of not more than 1.2 kg/cm$^2$ as has been experienced in the present invention is preferable, and in the case where the biaxial stretching is carried out in the conditions different from the above-mentioned conditions, thereby may be frequently the chances of troubles such as the tearing of the film in stretching and the unzipping of the chack of the tenter.

EXAMPLES 6 to 9

To 100 parts by weight of the same propylene homopolymer used in Example 1, an amount (shown in Table 2) of the hydrocarbon polymer obtained in (1) of Example 1 was added, and after subjecting the mixture to dry-blending, the thus dry-blended mixture was melt-keaded by a monoaxial extruder of a cylinder diameter of 40 mm at 190° C. to pelletize the mixture, i.e., the polypropylene resin composition according to the present invention melting at 162° C.

The composition was extruded into a shape of a sheet of 2 mm in thickness by a T-die type molding machine under the conditions of the temperature of the resin composition of 260° C., the temperature of the cooling rolls of 90° C., the winding-up rate of 0.5 m/min and the draft rate of 1.5.

The thus obtained sheet was at first stretched by rolls at 160° C. by 7 times in longitudinal direction and then stretched by a tenter at 165° C. by 7 times in transversal direction while using a tenter method apparatus for successive biaxial stretching to obtain a biaxially stretched film of about 40 μm in thickness. Furing the stretching, the rigidity of the film in stretching was measured by the aforementioned method and the stability of the film in stretching was evaluated according to the following standards, the stretching rate during the above-mentioned successive biaxial stretching being 100% sec.

Evaluation standards of the stability in stretching

The extent of occurrence of the unzipping of the chack of the tenter is adopted as the evaluation index of the stability as follows.

| Index | Situation in stretching |
|---|---|
| A | there were no problems. |
| B | without occurring any unzipping, however, uniform stretching could not be effected by the large stress. |
| C | unzipping occurred frequently to make the continuous operation impossible. |

EXAMPLE 10

In the same manner as in Example 9 except for using the propylene homopolymer of an isotactic pentad rate of 0.975 instead of the propylene homopolymer of an isotactic pentad rate of 0.980 in Example 9, a biaxially stretched film was prepared. The results are shown in Table 2.

COMPARATIVE EXAMPLE 5

In the same manner as in Example 6 except for not adding the saturated hydrocarbons polymer having a hydroxy group at the main chain end, a biaxially stretched film was prepared. The results are shown in Table 2.

COMPARATIVE EXAMPLE 6

In the same manner as in Example 6 except for adding the saturated hydrocarbons polymer having a hydroxy group at the main chain end instead of adding the amount of the hydrocarbon polymer in Example 6, a biaxially stretched film was prepared. The results are shown in Table 2.

COMPARATIVE EXAMPLE 7

In the same manner as in Example 6 except for (i) using a propylene homopolymer of MFi of 2.0 g/10 min and of the isotactic pentad rate of 0.955 instead of that of the isotactic pentad rate of 0.980 in Example 9 and (ii) not adding the saturated hydrocarbons polymer having a hydroxy group at the main chain end thereof, a biaxially stretched film was prepared. The results are shown also in Table 2.

COMPARATIVE EXAMPLE 8

In the same manner as in Example 6 except for (i) using a propylene homopolymer of MFi of 2.0 g/10 min and an isotactic pentad rate of 0.955 instead of the propylene homopolymer used in Example 6 and (ii) adding 2 parts by weight of the hydrocarbon polymer used in Example 6 instead of 3 parts by weight thereof, a biaxially stretched film was prepared. The results are shown also in Table 2.

TABLE 2

| Example No. | Physical properties of homopolymer of propylene | | Amount of hydrocarbon polymer[1] (parts by weight) | Elastic modulus in stretching (longitudinal/ transversal) (kg/cm²) | Stability in stretching |
|---|---|---|---|---|---|
| | MFi (g/10 min) | Isotactic pentad fraction | | | |
| Example | | | | | |
| 6 | 2.5 | 0.980 | 0.1 | 212/537 | A |
| 7 | 2.5 | 0.980 | 0.2 | 213/539 | A |
| 8 | 2.5 | 0.980 | 1 | 216/536 | A |
| 9 | 2.5 | 0.980 | 2 | 205/544 | A |
| 10 | 2.5 | 0.975 | 2 | 200/520 | A |
| Comparative Example | | | | | |
| 5 | 2.5 | 0.980 | 0 | 215/547 | C |
| 6 | 2.5 | 0.980 | 3 | 206/528 | B |
| 7 | 2.0 | 0.955 | 0 | 156/440 | A |
| 8 | 2.0 | 0.955 | 2 | 156/440 | A |

Note:
[1]Hydrocarbon polymer mans the saturated hydrocarbons polymer having a hydroxy group at the main chain end thereof.

What is claimed is:

1. A polypropylene resin composition, consisting essentially of:
   (a) 100 parts by weight of a propylene homopolymer showing a stereoregularity of a boiling heptane-insoluble portion thereof of not less than 0.960 as an isotactic pentad rate obtained by $^{13}$C-NMR, and
   (b) 0.01–2 parts by weight of a hydrocarbon polymer having a completely or partially saturated main hydrocarbon chain and at least one hydroxy group at the end of the hydrocarbon chain, said hydrocarbon polymer being a conjugated diene homopolymer or copolymer prepared by anionically or radically polymerizing the reacting monomers followed by at least partial hydrogenation or prepared by cationically polymerizing the reacting monomers followed by oxidation of the polymer obtained.

2. The polypropylene resin of claim 1, wherein said propylene homopolymer has a stereoregularity of the boiling heptane-insoluble portion thereof of not less than 0.970 as the isotactic pentad rate obtained by $^{13}$C-NMR.

3. The polypropylene resin of claim 1, wherein the amount of said hydrocarbon polymer blended with said propylene homopolymer ranges in amount from 0.1–2 parts by weight.

4. The polypropylene resin composition of claim 1, where the amount of said hydrocarbon polymer blended with said propylene homopolymer ranges in amount from 0.3–1.2 part by weight.

5. The polypropylene resin composition of claim 1, wherein said hydrocarbon polymer has at least one hydroxy group in the main chain end thereof and has a molecular weight ranging from 500–200,000.

6. The polypropylene resin composition of claim 1, wherein said hydrocarbon polymer has an average number of hydroxy groups of 1.5–8.0 per one molecule of the hydrocarbon polymer.

7. The polypropylene resin composition of claim 1, wherein said polymer or diene copolymer is produced by radical polymerization or anionic polymerization.

8. The polypropylene resin composition of claim 1, wherein the conjugated diene monomer of said conjugated diene homopolymer or copolymer is butadiene-1,3, isoprene, chloprene, pentadiene-1,3, 2,3-dimethyl-butadiene-1,3 or 1-phenyl-butadiene-1,3.

9. The polypropylene resin composition of claim 7, wherein said diene copolymer is a copolymer of a conjugated diene monomer and at least one vinyl monomer.

10. The polypropylene resin composition of claim 9, wherein said conjugated diene monomer is butadiene-1,3, isoprene, chloprene, pentadiene-1,3, 2,3-dimethyl-butadiene 1,3 or 1-phenyl-butadiene-1,3 and said vinyl monomer is an aromatic vinyl compound, a derivative of (meth)acrylic acid, a nitrile compound, a vinyl pyridine compound, a vinyl ether compound, a halogenated vinyl compound, a vinyl ester or a vinyl monomer which has an active hydrogen atom.

11. The polypropylene resin composition of claim 10, wherein said aromatic vinyl compound is alpha-methylstyrene or vinyltoluene, said (meth)acrylic acid derivative is methylacrylate, butylacrylate or methylmethacrylate; said nitrile compound is acrylonitrile or methacrylonitrile, said vinyl pyridine compound is 2-vinylpyridine or 4-vinylpyridine; said vinyl ether is methylvinyl ether or 2-chloroethyl vinyl ether; said halogenated vinyl compound is vinyl chloride or vinyl bromide; said vinyl ester is vinyl acetate; and said active hydrogen containing vinyl monomer is 2-hydroxyethyl methacrylate, acrylic acid or acrylamide.

12. The polypropylene resin composition of claim 9, wherein said vinyl monomer is present in the monomer mixture in an amount of not more than 50% by weight of the total amount of monomers.

13. The polypropylene resin composition of claim 2, wherein, in said cationic polymerization method of forming said hydrocarbon polymer, said copolymer obtained by polymerizing said diene and an α-olefin is oxidized, decomposed and reduced to obtain a polymer having at least one hydroxy group at the end of the main hydrocarbon chain.

14. The polypropylene resin composition of claim 13, wherein said α-olefin monomer is isobutylene.

15. The polypropylene resin composition of claim 13, wherein the conjugated diene monomer of said copolymer is butadiene or 1,3-pentadiene.

16. A biaxially stretched film prepared by a process comprising:
   forming a film by melt-molding the polypropylene resin composition of claim 1; and
   biaxially stretching the film obtained at a temperature of 150°–200° C.

17. The biaxially stretched film of claim 16, wherein the stretch ratio in the longitudinal to transverse directions of the film in said biaxial stretching ranges from 2–10.

* * * * *